(12) United States Patent
Xiao (10) Patent No.: US 11,177,541 B2
(45) Date of Patent: Nov. 16, 2021

(54) BATTERY AND DEVICE

(71) Applicant: Ningde Amperex Technology Limited, Fujian (CN)

(72) Inventor: Liangzhen Xiao, Fujian (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 119 days.

(21) Appl. No.: 16/203,601

(22) Filed: Nov. 28, 2018

(65) Prior Publication Data

US 2019/0319251 A1 Oct. 17, 2019

(30) Foreign Application Priority Data

Apr. 11, 2018 (CN) .......................... 201820510649.1

(51) Int. Cl.
*H01M 50/538* (2021.01)
*H01M 10/04* (2006.01)

(52) U.S. Cl.
CPC ....... *H01M 50/538* (2021.01); *H01M 10/049* (2013.01); *H01M 10/0431* (2013.01)

(58) Field of Classification Search
CPC ...... H01M 2/263; H01M 2/06; H01M 2/0267; H01M 2/0212; H01M 2/30; H01M 2/021; H01M 2/08; H01M 2/26; H01M 50/183; H01M 50/116; H01M 50/557; H01M 50/543; H01M 50/538; H01M 50/172; H01M 10/0431; H01M 10/049; Y02E 60/10

See application file for complete search history.

(56) References Cited

U.S. PATENT DOCUMENTS

| | | | | |
|---|---|---|---|---|
| 2001/0021471 A1* | 9/2001 | Xing | ................. | H01M 10/0525 |
| | | | | 429/162 |
| 2001/0038945 A1* | 11/2001 | Kitoh | ................ | H01M 10/0585 |
| | | | | 429/211 |
| 2013/0052512 A1* | 2/2013 | Moriuchi | ............ | H01M 2/0207 |
| | | | | 429/158 |
| 2016/0028110 A1* | 1/2016 | Yu | ........................ | H01M 10/052 |
| | | | | 429/303 |

* cited by examiner

*Primary Examiner* — Uyen M Tran
(74) *Attorney, Agent, or Firm* — Morgan, Lewis & Bockius LLP (57) ABSTRACT

The present application provides a battery including an electrode tab assembly that including an electrode tab and a protective layer arranged on the electrode tab including a first connecting layer arranged outside the protective layer, and a package film including a second connecting layer arranged outside the first connecting layer; after the electrode tab assembly is packaged, a first step and a second step are formed outside the package film, and the first step and the second step have a first thickness h and a second thickness j in a first direction of the battery. An object of the present application is to provide a battery capable of ensuring high sealing strength without leakage and penetration.

20 Claims, 5 Drawing Sheets

BATTERY AND DEVICE

PRIORITY CLAIM AND CROSS-REFERENCE

This application claims priority to and benefits of Chinese Patent Application Serial No. 201820510649.1 filed with China National Intellectual Property Administration on Apr. 11, 2018, entitled "BATTERY AND DEVICE", and the entire content of which is incorporated herein by reference.

FIELD OF THE APPLICATION

The present application relates to the field of energy storage, in particular, to a battery.

BACKGROUND OF THE APPLICATION

With the rapid development of portable electronic devices, the requirements for high-energy-density battery power supplies are becoming higher and higher, and it is difficult for a outer package materials using metal shells to meet the needs of portable electronic devices for thin and light battery power supply. At present, a soft outer package film is used as a package material for a battery, and a multilayer composite film such as an aluminum laminate film or a steel laminate film is used as an outer package material for a battery. This requires the outer package material being of long-term reliability and with certain tensile properties so as to still maintain the stability of its structure during the long-term repeated charging and discharging process of the battery. The outer package material plays a role in wear resistance, oxygen isolation, moisture resistance, insulation, corrosion resistance, etc., and is of great significance to the safety of the battery.

There are various specifications of aluminum-plastic composite film and stainless steel plastic composite film on the market, as well as electrode tab assemblies with different melting points. In the process of encapsulating the electrode tab assembly with the composite package film, if the package is too thin, there is a risk of short circuit; if the package is too thick, the strength is insufficient, there is a risk of battery flatulence resulted from the leakage of liquid or moisture permeation, which may affect the safety of the battery.

SUMMARY OF THE APPLICATION

Regarding to the problems existed in related prior art, an object of the present application is to provide a battery capable of ensuring high sealing strength without leakage of liquid.

According to an embodiment of the present application, a battery is provided, which including: an electrode tab assembly including an electrode tab and a protective layer arranged on the electrode tab, and including a first connecting layer, and the first connecting layer being arranged on the outside surface of the protective layer and away from the electrode tab; a package film including a second connecting layer arranged on a surface of the first connecting layer, wherein after the electrode tab assembly is packaged, a first step and a second step are formed on a surface of the package film; and the first step and the second step have a first thickness h and a second thickness j in a first direction of the battery respectively, the first thickness h and the second thickness j respectively satisfying the following formula:

$$2t+p-(2c+2a)\times 95\% < h < 2t+p-(2c+2a)\times 5\%;$$

$$2t+p-b-(2c+2a)\times 95\% < j < 2t+p-b-(2c+2a)\times 5\%;$$

wherein t is a thickness of the package film, a is a thickness of the second connecting layer, p is a thickness of the electrode tab assembly, c is a thickness of the first connecting layer, and b is a thickness of the electrode tab.

According to an embodiment of the present application, the first step and the second step have a first width i and a second width g along a second direction of the battery respectively, wherein the first width i and the second width g satisfy:

$$k \geq g > i > w;$$

wherein k is a width of the protective layer, and w is a width of the electrode tab.

According to an embodiment of the present application, the second step is formed on both sides of the first step along the second direction of the battery, wherein the first thickness h is greater than the second thickness j.

According to an embodiment of the present application, the package film further includes a first organic layer; and a first metal layer arranged between the first organic layer and the second connecting layer along the thickness direction of the package film.

According to an embodiment of the present application, the battery further comprising a battery element; the electrode tab includes, in order, a first region connected to the battery element, a second region in which the protective layer is arranged, and a third region along a length direction of the electrode tab.

According to an embodiment of the present application, the width of a portion of the protective layer exposed by the package film is greater than 0.05 mm along the length direction of the electrode tab.

According to an embodiment of the present application, the first connecting layer has a melting point of $MP_1$, and the second connecting layer has a melting point of $MP_2$, wherein $|MP_1 - MP_2| \leq 30°$ C.

According to an embodiment of the present application, a minimum distance between the first metal layer and the electrode tab is greater than 15 μm along the first direction of the battery.

According to an embodiment of the present application, the second connecting layer contains random polypropylene resin or chlorinated polypropylene resin, the first metal layer contains aluminum or stainless steel, the first organic layer contains nylon or polyethylene terephthalate, and the first connecting layer contains polypropylene or polyethylene.

According to an embodiment of the present application, a device including a housing and a battery received in the housing, and the battery described above is provided.

The beneficial technical effects of the present application are as follows:

In the battery provided by the present application, after the electrode tab assembly has been packaged, a first step and a second step are formed outside the package film. By forming the first step and the second step with a first thickness h and a second thickness j in a first direction of the battery, and by defining above thicknesses to be in the range of $2t+p-(2c+2a)\times 95\% < h < 2t+p-(2c+2a)\times 5\%$ and $2t+p-b-(2c+2a)\times 95\% < j < 2t+p-b-(2c+2a)\times 5\%$, the sealing strength of the battery may be ensured to be higher without liquid leakage.

DETAILED DESCRIPTION OF THE PREFERRED EXAMPLES

The present application will now be described with reference to FIG. 1 to FIG. 7. It is to be understood that the various embodiments shown in the following figures and the examples described below are exemplary embodiments of the present application and are not intended to limit the present invention. Various embodiments may be combined with one another to form other examples not shown in the figures.

Figure 1:
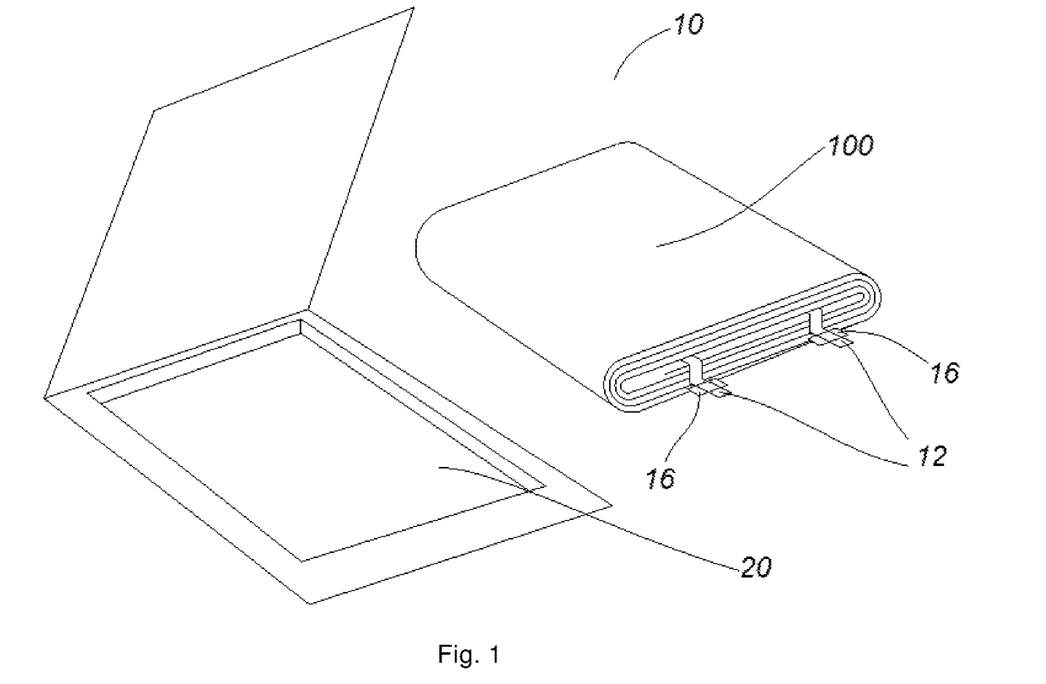
FIG. 1 is a view of the package of the battery according to an embodiment of the present application.

As shown in FIG. 1, according to an embodiment of the present application, a battery 10 is provided. Specifically, the battery 10 may be broadly described as including a battery element 100, an electrode tab assembly 12, and a package film 20. Among them, the battery element 100 includes a positive electrode, a negative electrode, a separator, and an electrolyte. The positive electrode includes a positive current collector and a positive active substance layer coated on the surface of the positive current collector. The negative electrode includes a negative current collector and a negative active substance layer coated on the surface of the negative current collector.

Figure 2:
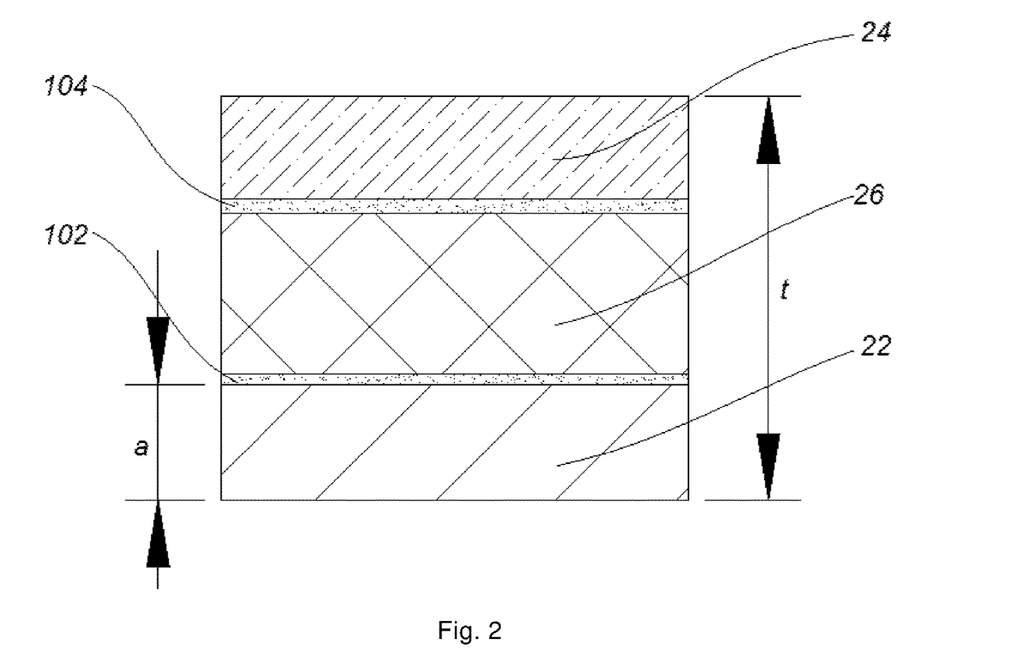
FIG. 2 is a section view of the package film according to an embodiment of the present application.
Figure 3:
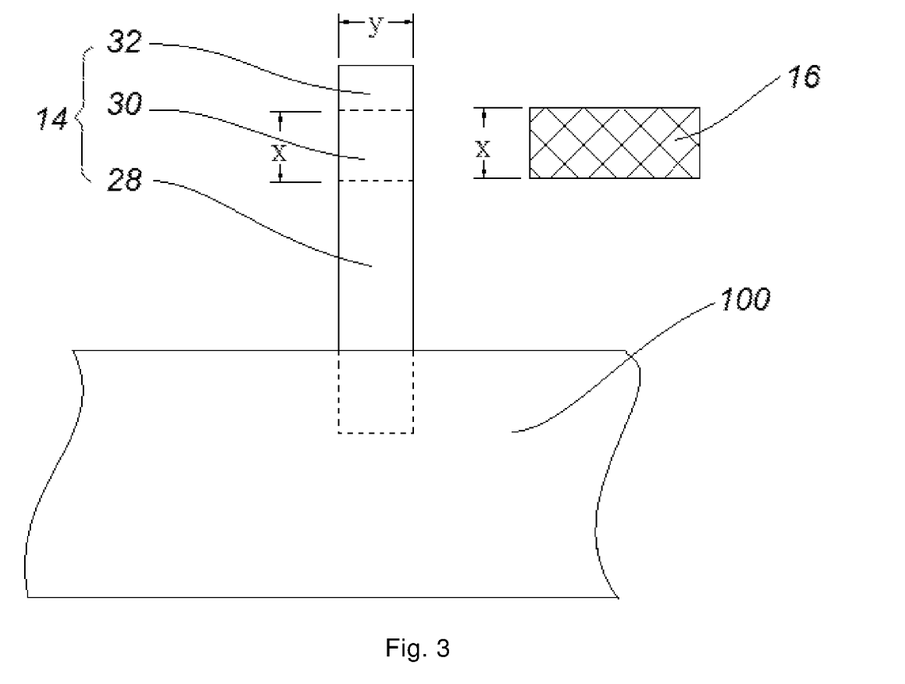
FIG. 3 is a front view of the electrode tab assembly according to an embodiment of the present application.
Figure 4:
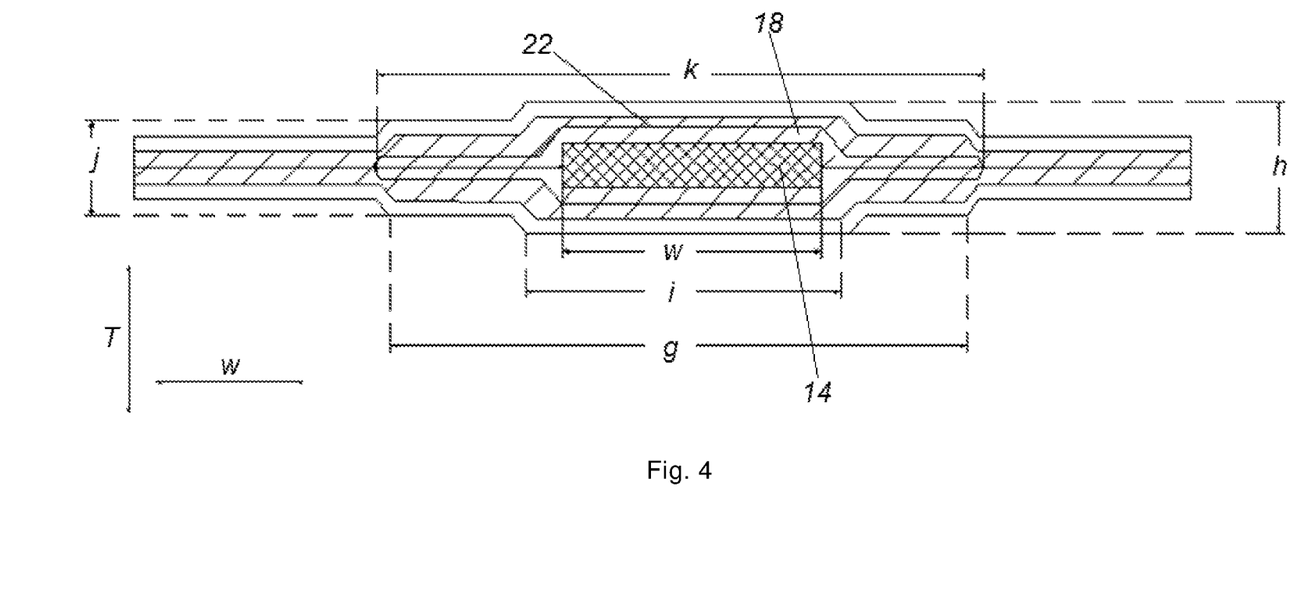
FIG. 4 is a partial section view of the battery element according to an embodiment of the present application.

With further reference to FIGS. 1 to 3, the electrode tab assembly 12 includes an electrode tab 14 and a protective layer 16 arranged on the electrode tab 14. The protective layer 16 includes a first connecting layer 18, and the first connecting layer 18 is arranged outside the protective layer 16. The package film 20 includes a second connecting layer 22 arranged outside the first connecting layer 18. After the electrode tab assembly 12 is packaged, the outside of the package film 20 forms a first step and a second step, as shown in FIG. 4.

It is understood that the package film 20 is used to package the battery element 100 and the electrode tab assembly 12, that is, the battery element 100 is packaged using the package film 20. The general process is: stamping the package film 20, punching out a slot of electrode assembly; placing an electrode assembly into the slot of electrode assembly, and then performing the package as shown in FIG. 1.

With reference to FIG. 2, in an embodiment of the present application, the package film 20 further includes a first organic layer 24, and a first metal layer 26 arranged between the first organic layer 24 and the second connecting layer 22 in the thickness direction of the package film 20. In an alternative embodiment, a first adhesive layer 102 may be arranged between the first metal layer 26 and the second connecting layer 22, and a second adhesive layer 104 may be arranged between the first organic layer 24 and the first metal layer 26. Further, the package film 20 may also have a matte layer outside the first organic layer 24.

With further reference to FIG. 3, in an embodiment of the present application, the electrode tab 14 includes, in order, a first region 28 connected to the battery element 100, a second region 30 in which above protective layer 16 is arranged and a third region 32, in the length direction of the electrode tab 14. Among them, the width of the electrode tab 14 is y and the width of the protective layer 16 is x. It is understood that the first region 28 may form a connection region connected with the battery element 100, and the third region 32 may be formed as a head empty foil region of the electrode tab 14.

Now see FIGS. 4 through 7. In the first direction T of the battery 10 (e.g., in the thickness direction of the battery 10 in the illustrated embodiment), the first step has a first thickness h and the second step has a second thickness j. Among them, the first thickness h and the second thickness j respectively satisfy the following formula:

$$2t+p-(2c+2a)\times 95\% < h < 2t+p-(2c+2a)\times 5\%;$$

$$2t+p-b-(2c+2a)\times 95\% < j < 2t+p-b-(2c+2a)\times 5\%;$$

Specifically, t is the thickness of the package film 20, a is the thickness of the second connecting layer 22, p is the thickness of the electrode tab assembly 12, c is the thickness of the first connecting layer 18, and b is the thickness of the electrode tab 14.

Wherein, in the above formula of the present application, the units of the respective thicknesses are the same.

As stated above, in the battery 10 provided by the present application, after the electrode tab assembly 12 is packaged, a first step and a second step may be formed outside the package film 20. By forming the first step and the second step with a first thickness h and a second thickness j in the first direction T of the battery 10, and by defining above thicknesses to be in the range of $2t+p-(2c+2a)\times 95\% < h < 2t+p-(2c+2a)\times 5\%$ and $2t+p-b-(2c+2a)\times 95\% < j < 2t+p-b-(2c+2a)\times 5\%$ respectively, the sealing strength of the battery may be ensured to be higher without liquid leakage.

With further reference to FIG. 4, the first step and the second step have a first width i and a second width g in a second direction W of the battery 10 (e.g., in the width direction of the battery 10 in the illustrated embodiment), wherein the first width i and the second width g satisfy:

$$k \geq g > i > w;$$

Specifically, k is the width of the protective layer 16, and w is the width of the electrode tab 14.

In an alternative embodiment of the present application, as shown in FIG. 4, the second step is formed on both sides of the first step in the second direction W of the battery 10, and wherein the first thickness h is greater than the second thickness j.

As shown, in an embodiment of the present application, the sum of the thickness a of the second connecting layer 22 and the thickness c of the first connecting layer 18 is f, f=a+c. In the present application, when the electrode tab 12 is packaged, the thermal compression ratio of the second connecting layer 22 and the first connecting layer 18 is 5% to 95%, so that a better melting effect may be achieved to ensure a high strength and no leakage and penetration. If the thermal compression ratio is less than 5%, the connection area may be too thin and there is a risk of short circuit; if the thermal compression ratio is greater than 95%, the package is too thick, the strength of the hot press is insufficient, and there is a risk of leakage or moisture penetration.

Figure 5:
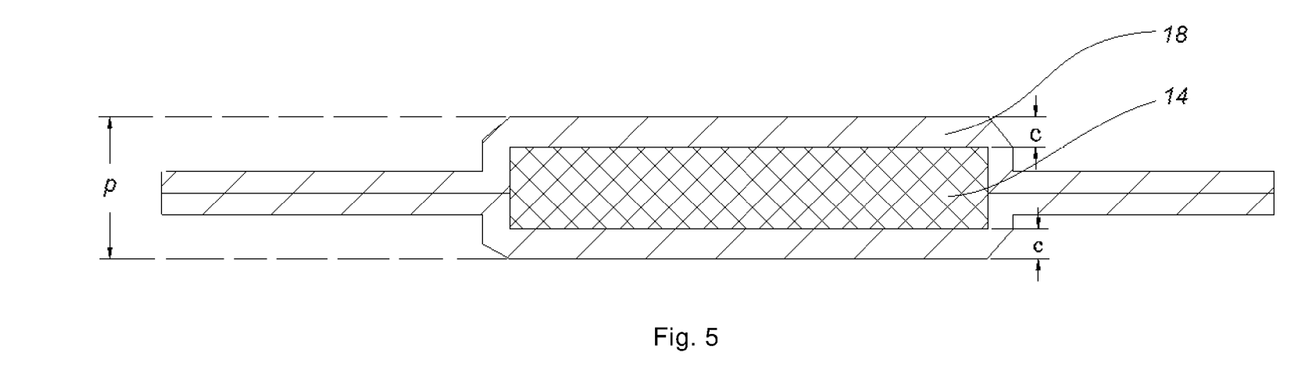
FIG. 5 is a section view of the single-layered electrode tab assembly according to an embodiment of the present application.
Figure 6:
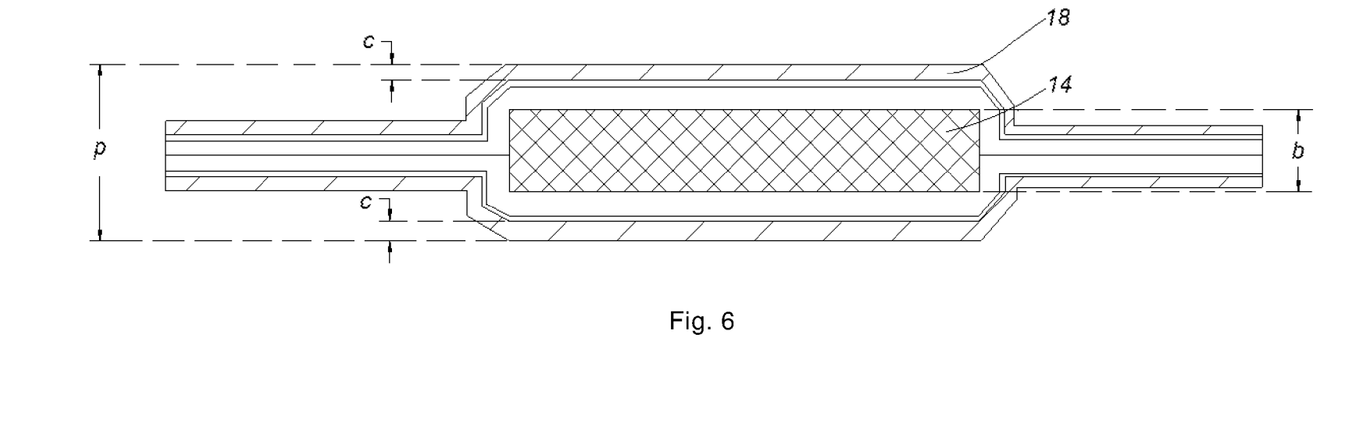
FIG. 6 is a section view of multi-layers of single-layered electrode tab assembly according to an embodiment of the present application.

According to an embodiment of the present application, the first connecting layer 18 forms the outermost layer of the protective layer 16. The resin layer outside the electrode tab assembly 12 is a single layer, and its cross-sectional structural view in the thickness direction of the electrode tab assembly 12 is shown in FIG. 5; the resin layer outside the electrode tab assembly 12 is a multilayer, and the outermost layer is the first connecting layer 18, and its cross-sectional structural view in the thickness direction of the electrode tab assembly 12 is shown in FIG. 6. When the resin layer outside the electrode tab assembly 12 is a multilayer structure, the melting points of the materials of the different layers are different, and the outermost layer is a resin layer having a melt heat sealing effect. Preferably, the inner layer may be made of the material with a high melting point to enhance the insulating effect, thus avoiding over-melting of the first connecting layer 18 which may cause the electrode tab 14 and the first metal layer 26 of the package film 20 to conduct to form electrochemical corrosion.

In addition, in an alternative embodiment of the present application, the width of the portion of the protective layer 16 exposed by the package film 20 may be greater than 0.05 mm in the length of the electrode tab 14. Alternatively, the minimum distance between the first metal layer 26 and the electrode tab 14 may be greater than 15 µm in the first direction T of the battery 10.

Further, according to an alternative embodiment of the present application, the first connecting layer 18 has a melting point of $MP_1$, and the second connecting layer 22 has a melting point of $MP_2$, wherein $|MP_1-MP_2|\leq 30°$ C. Thus, the sealing effect may be further improved. If the difference in melting points between the first connecting layer 18 and the second connecting layer 22 is too large, the heat sealing and melting effect is poor, the strength is low, and there is a risk of leakage and moisture permeation.

According to an alternative embodiment of the present application, the second connecting layer 22 may contain random polypropylene resin or chlorinated polypropylene resin, the first metal layer 26 may contain aluminum or stainless steel, the first organic layer 24 may contain nylon or polyethylene terephthalate, and the first connecting layer 18 may contain polypropylene or polyethylene.

Figure 7:
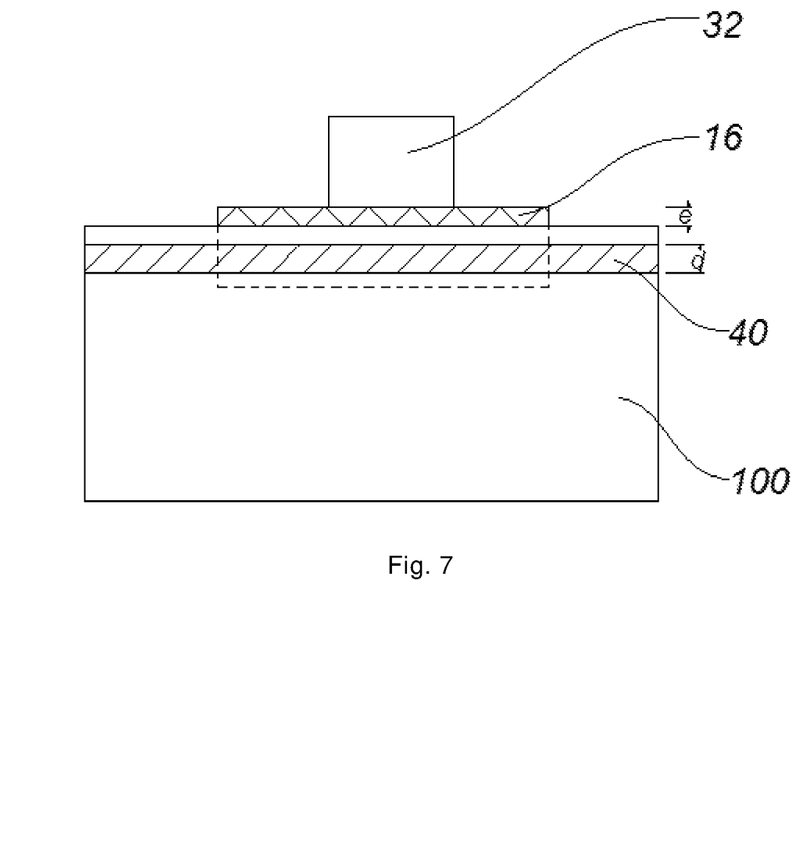
FIG. 7 is a partial front view of the battery element according to an embodiment of the present application.

According to an embodiment of the present application, as shown in FIG. 7, the width x of the protective layer 16 is greater than the width d of a sealing portion 40 of the battery element 100 in the length direction of the electrode tab 14. If the width of the sealing portion 40 is too small, the sealing effect is poor, and if the width of the sealing portion 40 is too large, the battery energy density may be lowered. If the width of the sealing portion 40 exceeds the width of the protective layer 16, there may be a risk of corrosion and leakage.

According to an embodiment of the present application, in order to avoid the first metal layer 26 directly contacting the electrode tab 14, the width e of the portion of the protective layer 16 exposed by the package film 20 is greater than 0.1 mm in the length direction of the electrode tab 14.

According to an embodiment of the present application, the minimum distance between the first metal layer 26 and the electrode tab 14 is greater than 15 µm in the thickness direction of the sealing portion 40. That is, the distance at any position between the first metal layer 26 and the electrode tab 14 is greater than 15 µm. Thereby, it is further ensured that the electrode tab 14 of the electrode tab assembly 12 has a certain insulation distance from the first metal layer 26 in the package film, thus avoiding electrochemical corrosion and short circuit.

In the preparation process of the present application, the positive active substance layer contains a positive active material, and the positive active material may be one selected from a group consisting of lithium cobaltate, lithium manganate, nickel cobalt aluminum ternary material (NCA) and nickel cobalt manganese ternary material (NCM); the negative active substance layer contains a negative active material, and the negative active material may be one selected from a group consisting of graphite and a Si-containing material.

The electrolyte may be selected from solid, liquid, and gel electrolytes.

When a liquid electrolyte or a gel state electrolyte is used, the battery element 100 further contains a separator, and the separator is selected from a polyolefin separator.

Specifically, the positive electrode may be prepared as follows:

The positive electrode includes a positive current collector and a positive active material layer coated on the surface of the current collector. The positive current collector is made of a metal foil, and aluminum foil is commonly used. The positive active material layer includes a positive active substance, a binder, and a conductive agent. The positive active substance may be a composite oxide composed of a transition metal such as lithium cobaltate, lithium iron phosphate, nickel cobalt manganese or nickel cobalt aluminum or lithium manganate. The conductive agent may be a conductive material such as carbon black, carbon nanotubes, carbon fibers, graphene, or conductive graphite. The binder may be polytetrafluoroethylene or poly(vinylidene fluoride). The solvent may be N-methylpyrrolidone (NMP). The following example exemplifies a certain ratio of the positive material, and is not limited to the mixing ratio.

Preparing a positive slurry contains 97% lithium cobaltate: 1.8% conductive carbon black: 1.2% binder of polyvinylidene fluoride. The lithium cobaltate and the conductive agent are firstly mixed uniformly, and the solvent NMP is added to uniformly disperse and the binder is added to adjust the viscosity to obtain a positive slurry. The positive slurry is uniformly coated on the surface of the current collector, followed by drying at a high temperature to remove the solvent, and rolling to form a compacted positive electrode.

The negative electrode may be prepared as follows:

The negative electrode includes a negative current collector and a negative active material layer coated on the surface of the current collector. The negative current collector is made of a metal foil, and copper foil is commonly used. The negative active material layer includes a negative active substance, a binder, and a conductive agent. The negative active substance may be graphite or a carbon-containing composite or a metal material such as artificial graphite, natural graphite, mesocarbon microbeads, carbon fiber, hard carbon, silicon carbon negative electrode, lithium negative electrode, and the like. The conductive agent may be a conductive material such as carbon black, carbon nanotubes, carbon fibers, graphene, or conductive graphite. The binder may be styrene-butadiene rubber or poly(vinylidene fluoride). If necessary, a thickener such as sodium carboxymethylcellulose (CMC) may be added to make the negative slurry more stable. The solvent may be N-methylpyrrolidone (NMP) or deionized water. The negative material of one of the ratios is exemplified below, and is not limited to the mixing ratio, and the solvent is deionized water. Preparing a negative slurry contains 96.5% artificial graphite: 1% conductive carbon black: 1.5% styrene butadiene rubber: 1% CMC. The graphite and the conductive carbon black are firstly mixed uniformly, and the solvent of deionized water and CMC is added to uniformly disperse, and the binder of styrene-butadiene rubber is added to adjust the viscosity, to obtain a negative slurry. The negative slurry is uniformly coated on the surface of the current collector, followed by drying at a high temperature to remove the solvent, and rolling to form a compacted negative electrode.

The electrolyte may be prepared as follows:

The electrolyte includes an electrolyte salt and an organic solvent, and a gel electrolyte may also be used.

The organic solvents that can be used as the electrolyte may be: diethyl carbonate, dimethyl carbonate, ethyl methyl carbonate, dipropyl carbonate, ethyl propyl carbonate, propylene carbonate, ethylene carbonate, propylene carbonate, ethyl propionate, propyl propionate, propylene sulfite, and the like. The electrolyte salt may be, for example, $LiPF_6$, $LiBF_4$, or the like.

In this embodiment, an electrolyte having a solvent ratio of 50% of propionic acid propionate, 25% of ethylene carbonate, 16% of propylene carbonate, 6% of ethanedinitrile, 3% of ethylene carbonate, and a lithium salt $LiPF_6$ with a concentration of 1.1 mol/L is used.

Separator:

A porous polyethylene film having a thickness of 8 um and a porosity of 30% is used.

Preparation of Battery:

The positive and negative electrodes are cut to make the negative electrode 2 mm wider than the positive electrode, and the negative electrode tab is taken out at the empty current collector of the negative electrode, and the positive electrode tab is taken out at the empty current collector of the positive electrode. And the width of the separator is 2.5 mm wider than the negative electrode to ensure that there is a separator between the positive and negative electrodes for insulation, the opposite side of the positive active material layer is wrapped by the negative active material layer, and the separator exceeds both ends of the negative electrode. Then the positive and negative electrodes and the separator are wound to obtain the battery element 100.

As shown in FIG. 1, after the battery element is placed in a package bag for top-sealing, the electrolyte is injected to complete the package, and after the formation, the gas is extracted and the opening is sealed to form the battery.

According to an embodiment of the present application, a device is provided. The device includes a housing, and the battery 10 is received in the housing.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A battery, comprising:
an electrode tab assembly, comprising:
an electrode tab,
a protective layer arranged on the electrode tab,
a first connecting layer disposed on an outer surface of the protective layer; and
a package film comprising a second connecting layer arranged on a surface of the first connecting layer, wherein a first step, a second step, and a third step formed on a surface of the package film, the first step and the second step have a first thickness h and a second thickness j in a first direction of the battery respectively, the first thickness h and the second thickness j respectively satisfying the following formula:

$$2t+p-(2c+2a)\times 95\% < h < 2t+p-(2c+2a)\times 5\%;$$

$$2t+p-b-(2c+2a)\times 95\% < j < 2t+p-b-(2c+2a)\times 5\%;$$

wherein t is a thickness of the package film, a is a thickness of the second connecting layer, p is a thickness of the electrode tab assembly, c is a thickness of the first connecting layer, and b is a thickness of the electrode tab, and wherein the third step has a thickness that is smaller than the first thickness h and the second thickness j.

2. The battery according to claim 1, wherein the first step and the second step have a first width i and a second width g along a second direction of the battery respectively, wherein the first width i and the second width g satisfy:

$$k \geq g > i > w;$$

wherein k is a width of the protective layer, and w is a width of the electrode tab.

3. The battery according to claim 1, wherein the second step is formed on both sides of the first step along the second direction of the battery, wherein the first thickness h and the second thickness j satisfy: h>j.

4. The battery according to claim 1, wherein the package film further comprises a first organic layer and a first metal layer arranged between the first organic layer and the second connecting layer along a thickness of the package film.

5. The battery according to claim 1, further comprising a battery element;
wherein the electrode tab comprises, in order, a first region connected to the battery element, a second region in which the protective layer is arranged, and a third region along a length direction of the electrode tab.

6. The battery according to claim 1, wherein the width of a portion of the protective layer exposed by the package film is greater than 0.05 mm along a length direction of the electrode tab.

7. The battery according to claim 1, wherein the first connecting layer has a melting point of $MP_1$, and the second connecting layer 22 has a melting point of $MP_2$, wherein $|MP_1-MP_2| \leq 30°$ C.

8. The battery according to claim 4, wherein a minimum distance between the first metal layer and the electrode tab is greater than 15 μm along the first direction of the battery.

9. The battery according to claim 4, wherein the second connecting layer contains random polypropylene resin or chlorinated polypropylene resin, the first metal layer contains aluminum or stainless steel, the first organic layer contains nylon or polyethylene terephthalate, and the first connecting layer contains polypropylene or polyethylene.

10. A device, comprising a housing and a battery received in the housing, the battery comprising:
an electrode tab assembly comprising an electrode tab, a protective layer arranged on the electrode tab, and a first connecting layer arranged on an outer surface of the protective layer and away from the electrode tab;
a package film comprising a second connecting layer arranged on the surface of the first connecting layer, wherein a first step, a second step, and a third step formed on a surface of the package film, the first step and the second step have a first thickness h and a second thickness j in a first direction of the battery respectively, the first thickness h and the second thickness j respectively satisfying the following formula:

$$2t+p-(2c+2a)\times 95\% < h < 2t+p-(2c+2a)\times 5\%;$$

$$2t+p-b-(2c+2a)\times 95\% < j < 2t+p-b-(2c+2a)\times 5\%;$$

wherein t is a thickness of the package film, a is a thickness of the second connecting layer, p is a thickness of the electrode tab assembly, c is a thickness of the first connecting layer, and b is the thickness of the electrode tab, and wherein the third step has a thickness that is smaller than the first thickness h and the second thickness j.

11. The device according to claim 10, wherein the first step and the second step have a first width i and a second width g along a second direction of the battery respectively, wherein the first width i and the second width g satisfy:

$$k \geq g > i > w;$$

wherein k is a width of the protective layer, and w is a width of the electrode tab.

12. The device according to claim 10, wherein the second step is formed on both sides of the first step along the second direction of the battery, wherein the first thickness h and the second thickness j satisfy: h>j.

13. The device according to claim 10, wherein the package film further comprises a first organic layer and a first metal layer arranged between the first organic layer and the second connecting layer along a thickness of the package film.

14. The device according to claim 10, the battery further comprising a battery element; wherein the electrode tab comprises, in order, a first region connected to the battery element, a second region in which the protective layer is arranged, and a third region along a length direction of the electrode tab.

15. The device according to claim 10, wherein the width of a portion of the protective layer exposed by the package film is greater than 0.05 mm along a length direction of the electrode tab.

16. The device according to claim 10, wherein the first connecting layer has a melting point of $MP_1$, and the second connecting layer 22 has a melting point of $MP_2$, wherein $|MP_1 - MP_2| \leq 30°$ C.

17. The device according to claim 13, wherein a minimum distance between the first metal layer and the electrode tab is greater than 15 μm along the first direction of the battery.

18. The device according to claim 13, wherein the second connecting layer contains random polypropylene resin or chlorinated polypropylene resin, the first metal layer contains aluminum or stainless steel, the first organic layer contains nylon or polyethylene terephthalate, and the first connecting layer contains polypropylene or polyethylene.

19. The battery according to claim 1, wherein the protective layer is a resin layer, the resin layer outside the electrode tab assembly is a single layer.

20. The device according to claim 10, wherein the protective layer is a resin layer, the resin layer outside the electrode tab assembly is a single layer.

* * * * *